Nov. 14, 1950 J. H. GEISSE 2,529,932
AIRPLANE CROSS-WIND UNDERCARRIAGE
Filed Nov. 14, 1947 2 Sheets-Sheet 1
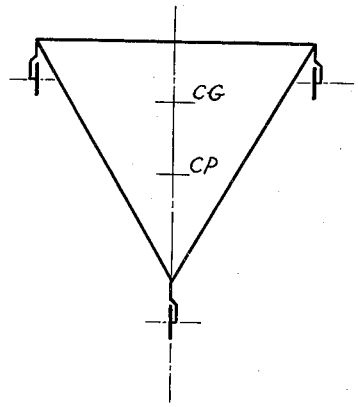
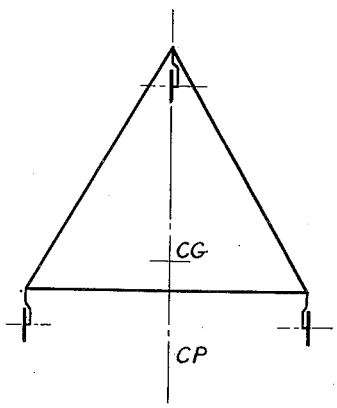
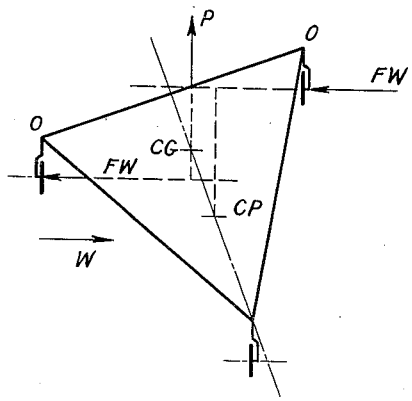
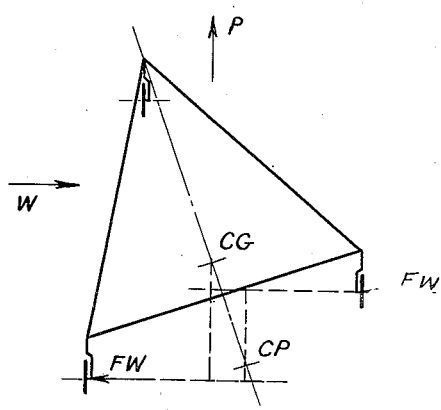
INVENTOR
John Harlin Geisse Nov. 14, 1950           J. H. GEISSE           2,529,932
AIRPLANE CROSS-WIND UNDERCARRIAGE
Filed Nov. 14, 1947           2 Sheets-Sheet 2
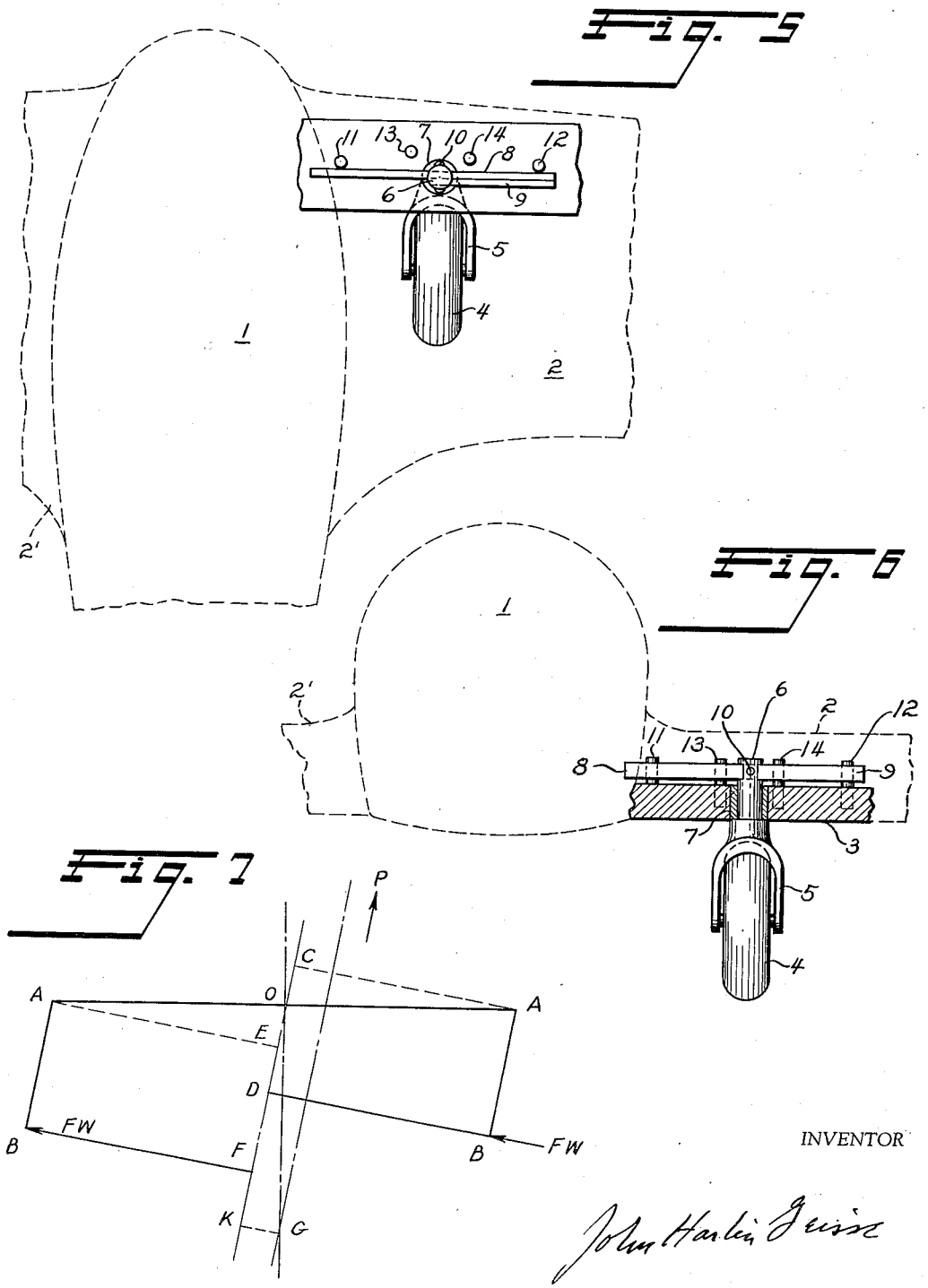
INVENTOR
John Harlin Geisse Patented Nov. 14, 1950

2,529,932

UNITED STATES PATENT OFFICE 2,529,932

AIRPLANE CROSS-WIND UNDERCARRIAGE

John Harlin Geisse, Madison, Wis.

Application November 14, 1947, Serial No. 786,118

6 Claims. (Cl. 244—103)

My invention relates to improvements in undercarriages of the so-called cross-wind landing type in which the main wheels are castered and has for its objective a substantial improvement in their performance with little or no increase in cost.

It is particularly desirable that such undercarriages enable control of the path of the airplane on the ground with application of minimum forces by the steering control whether that be aerodynamic rudder, steerable nose or tail wheel, or differential brakes. It is also desirable when steering is by steerable nose or tail wheel that stable taxi conditions can be established by a force tending to hold or return the steerable wheel to its neutral position.

My invention may best be described by reference to diagrams as the particular mechanism used to implement the invention is quite immaterial.

Figure 1 illustrates a conventional undercarriage and Figure 2 a so-called tricycle undercarriage. In each the center of gravity of the airplane is indicated by the letters CG and the center of aerodynamic pressure by the letters CP.

Figures 3 and 4 illustrate wind and ground forces applied to undercarriages similar to those of Figures 1 and 2, respectively.

Figures 5 and 6 are plan and elevation, respectively, of a device incorporating one application of the invention.

Figure 7 is a force vector diagram illustrating the invention.

It will be apparent that if all of the wheels in either Figure 1 or Figure 2 were freely castered the path of the airplane could be controlled only by areodynamic forces and since these are not always controllable by the pilot it has been customary to provide some form of castering restraint on the main wheels. It has also been common practice to provide the same amount of castering restraint to both main wheels and a restraint for each which was of the same magnitude for castering in either direction from neutral.

Figures 3 and 4 illustrate the relations which would exist between wheel positions, center of gravity, center of aerodynamic pressure, and wheel side forces, $F_w$, under conditions establishing such wheel side forces.

In Figures 3 and 4 the main wheels are shown in the castered position they would assume in a cross wind landing with the wind in the direction indicated by the arrows W and with the airplane moving in the direction indicated by the arrows P. The side loads to which the wheels would be subjected in such a landing are indicated by the force vectors $F_w$.

Referring now particularly to Figure 3, it will be noted that the intersection of extension of the vector $F_w$ of the right or downwind wheel which is toed out and the longitudinal axis of the airplane has moved forward whereas the intersection of the extension of the vector $F_w$ of the left or upwind wheel which is toed in and the longitudinal axis has moved backward. A simple analysis of these changes will show that the moment arm of the force vector $F_w$ of the right wheel around the center of gravity of the airplane, designated as CG on the drawing, has increased an amount equal to the distance from the caster axes, designated as O on the drawing, to the longitudinal axis of the airplane multiplied by the sine of the angle of caster and that the moment arm of the vector $F_w$ of the left wheel has decreased the same amount. In the illustration shown the moment of the left wheel vector $F_w$ has become negative, i. e. it is clockwise whereas that of the right wheel is anticlockwise.

The change in the moment arms of the wheel side forces is shown in Figure 7 in which the caster axes are marked A and the points of contact of the wheels with the ground are marked B.

The lines BD and BF correspond to the force vectors $F_w$ and are perpendicular to the lines AB. The point O is midway between the points A and the dot dash line OF is parallel with the lines AB. The lines AC and AE are parallel to the lines BD and BF.

Taking moment arms around the point O first, it is apparent that when the wheels are straight ahead both moment arms are equal to AB. With the right wheel in the castered position its moment arm OD is equal to CD or AB minus OC. Likewise the moment arm OF of the left wheel is equal to EF of AB plus OE. Both OE and OC are equal to OA sine X, X being the degrees of caster angle.

Assuming now that the center of gravity is at some distance OG back of O, the moment arms of both BD and BF around G will be equal to their moment arms around O minus OK which is equal to OG cos X.

The changes in moment arms are therefore equal but opposite and if the forces $F_w$ are the same for both wheels the total effect of the changes in moment arms on the turning moment around the CG is zero.

Hitherto the restraints used have been the same for nose in and nose out and as a result no advantage has been taken of the changes in the moment arms of the wheel side forces which occur when the wheels caster. Any engineer having been shown that there are advantages to be gained by using greater restraint to nose in that to nose out, would have no difficulty in designing such restraints. The particular form of restraint used to illustrate the invention is therefore not a part of the invention.

If the forces indicated by the vectors $F_w$ are of equal magnitude on both wheels, then the changes in their moments around the CG just counterbalance each other. However, the magnitude of these forces are determined by the amount of caster restraint employed and in previous cross wind undercarriages they have been equal because it has been customary to use the same amount of restraint against both toeing in and toeing out. In accordance to my invention, the restraint against toe in is made greater than the restraint against an equal amount of toe out. This causes the force $F_w$ on the left or upwind wheel to be greater than the forces $F_w$ on the right or downwind wheel and thus takes advantage of the changes in their respective moment arms around the CG of the airplane.

Figure 6 is similar to Figure 3 and shows the application of the analysis to a tricycle type of undercarriage. Here the advantage does not consist of reducing or eliminating ground looping moments since they do not exist with the tricycle type of undercarriage. The advantage lies in increasing the anti-ground looping moment for the same amount of side force on the main wheels. Another advantage lies in the reduction or elimination of weather vaning tendencies when taxiing across the wind. In practically all airplanes the center of pressure of cross wind forces on the airplane, designated as CP in the drawing, is to the rear of the main wheels. In cross wind taxiing and in the absence of acceleration, the resultant of the wheel side loads $F_w$ must be equal and opposite to the force of the wind on the side of the airplane. If this resultant passes ahead of the center of pressure, CP, it with the wind force constitutes a couple tending to turn the airplane into the wind. Using my invention, this resultant can be moved back, thus reducing or eliminating the weather vaning tendency. In the case illustrated, it will be evident that the side loads on the wheels could be so proportioned than an anti-weather vaning moment could be created.

In the foregoing analysis it will be observed that I have considered only that component of the ground to tire reaction which is perpendicular to the plane of the wheel and which is determined by the amount of caster restraint employed. It has been customary in the past to also consider the components in the plane of the wheel and to assume that this component also varied directly with the amount of caster restraint used. This method of analysis leads to the conclusion that the best performance would be obtained by using a greater restraint on the downwind wheel than on the upwind wheel—exactly opposite to my own discovery. I have found that the assumption that the component of the ground to tire reaction in the plane of the wheel is proportional to the caster restraint is not correct and that in fact they are largely unaffected by changes in caster restraint. Hence, in the determination of the desirable relationship between toe in and toe out caster restraint these components of the ground to tire reactions should be ignored.

One embodiment of my invention is illustrated in Figures 5 and 6, Figure 5 being a plan view and Figure 6 being a rear elevation corresponding to Figure 5.

In Figures 5 and 6, 1 denotes generally the body of an airplane and 2, 2' the wings thereof. 3, 3' designate suitable members of the airplane structure to which the main wheels 4, 4' are attached. The wheels 4, 4' are mounted in the wheel forks 5, 5' which terminate at their upper ends in the spindles 6, 6'. The spindles 6, 6' are rotatably supported in the bearings 7, 7' which are supported in the members 3, 3'. The forks 5, 5' are so formed as to support the wheels 4, 4' to the rear of the spindles 6, 6' to provide castering action. Spindles 6, 6' are slotted at their upper ends to receive the spring leaves 8, 8' and 9, 9'. The spring leaves are held in place with the rivets 10, 10'. Spring leaves 8, 8' extend out from both sides of the spindles 6, 6' and contact at their outer ends the pins 11, 11' and 12, 12'. Pins 11, 11' and 12, 12' are anchored in the members 3, 3'. Spring leaves 9, 9' extend outwardly only from the spindles 6, 6' and reenforce the outwardly extending parts of the spring leaves 8, 8'.

Pins 13, 13' and 14, 14' also anchored in members 3, 3', are stops to limit the maximum rotation of the spindles 6, 6' and are so located that the maximum outward rotation, clockwise for the right hand spindle 6 and anti-clockwise for the left hand spindle 6', is greater than the maximum inward rotation.

It will be apparent after study of the description of my invention and the illustration of one embodiment thereof that various modifications and changes may be made in this embodiment in accomplishing the desired results without departing from the invention or the scope of the following claims.

What I claim is:

1. An airplane cross wind undercarriage including laterally spaced main wheels, caster mountings for said main wheels, and means yieldably resisting the castering of said main wheels, said means imposing a greater resistance to toeing in than toeing out.

2. An airplane cross wind undercarriage including laterally spaced main wheels, caster mountings for said main wheels, resilient means opposing the toeing out of said main wheels, and other less resilient means opposing toeing in of said main wheels.

3. A cross wind undercarriage for airplanes including laterally spaced main wheels mounted for castering both inwardly and outwardly, means strongly opposing but not preventing the toeing in of said main wheels, and other means less strongly and yieldably opposing the toeing out of said main wheels.

4. A cross wind undercarriage for airplanes including laterally spaced main wheels mounted for castering both inwardly and outwardly from their straight ahead position, spring means opposing the toeing out of said main wheels, and stronger spring means opposing the toeing in of said main wheels.

5. A cross wind undercarriage for airplanes including laterally spaced main wheels mounted for castering both inwardly and outwardly, means strongly but yieldably opposing the toeing in of said main wheels, other means less strongly and yieldably opposing the toeing out of said main wheels, stops limiting the amount of toe out to a predetermined value, and other stops limiting the amount of toe in to some lesser value.

6. A cross wind undercarriage for airplanes including laterally spaced main wheels, caster mountings for said main wheels and stops limiting the maximum amount of toe in to some value less than the maximum amount of toe out.

JOHN HARLIN GEISSE.

REFERENCES CITED

The following references are of record in the file of this patent:

UNITED STATES PATENTS

| Number | Name | Date |
|---|---|---|
| 2,222,850 | Maclaren | Nov. 26, 1940 |
| 2,351,935 | Devlin | June 20, 1944 |

FOREIGN PATENTS

| Number | Country | Date |
|---|---|---|
| 883,921 | France | Apr. 5, 1943 |
| 634,357 | Germany | Aug. 25, 1936 |